United States Patent [19]

Jaeger

[11] Patent Number: 5,421,358
[45] Date of Patent: Jun. 6, 1995

[54] FLUID VALVE MECHANISM AND VALVING METHOD

[76] Inventor: Robert A. Jaeger, 3822 Cloverhill Ct., Brandon, Fla. 33511

[21] Appl. No.: 226,283

[22] Filed: Apr. 11, 1994

Related U.S. Application Data

[62] Division of Ser. No. 65,810, May 21, 1993, Pat. No. 5,309,934.

[51] Int. Cl.⁶ .................... F16K 11/065; F16K 31/54
[52] U.S. Cl. ................................ 137/1; 137/614.13; 137/815; 137/883; 251/250; 251/282
[58] Field of Search ............... 137/1, 614.13, 614.15, 137/862, 865, 883; 251/250, 212, 282

[56] References Cited

U.S. PATENT DOCUMENTS

| | | | |
|---|---|---|---|
| 120,311 | 10/1871 | Müller | 137/614.15 |
| 637,010 | 11/1899 | Mumford | 137/865 |
| 667,553 | 2/1901 | Mumford | 137/865 |
| 1,065,916 | 7/1913 | Brown | 137/865 |
| 1,182,737 | 5/1916 | Bartz | 137/614.15 |
| 1,387,446 | 8/1921 | Astier | 137/614.15 |
| 2,238,374 | 4/1941 | Sallee | 137/865 |
| 2,713,350 | 7/1955 | Payne | 137/614.15 |
| 2,880,748 | 4/1959 | Elsey | 137/614.13 |
| 3,596,679 | 8/1971 | Sugden, Jr. | 137/865 |

FOREIGN PATENT DOCUMENTS

| | | | |
|---|---|---|---|
| 645515 | 7/1962 | Canada | 137/865 |
| 907444 | 3/1946 | France | 137/614.15 |
| 2458728 | 1/1981 | France | . |
| 339394 | 7/1921 | Germany | 137/865 |
| 547765 | 3/1932 | Germany | 137/865 |
| 3240720 | 5/1984 | Germany | 137/614.15 |

Primary Examiner—George L. Walton
Attorney, Agent, or Firm—Charles A. McClure

[57] ABSTRACT

A piston fluid valve mechanism and method, wherein annular outer and core inner coaxial valve members are adapted to move to and fro slidably relative to one another and to bar upstream-to-downstream fluid flow when mutually juxtaposed into seated position but adapted to enable such flow when spaced apart in unseated position.

18 Claims, 3 Drawing Sheets

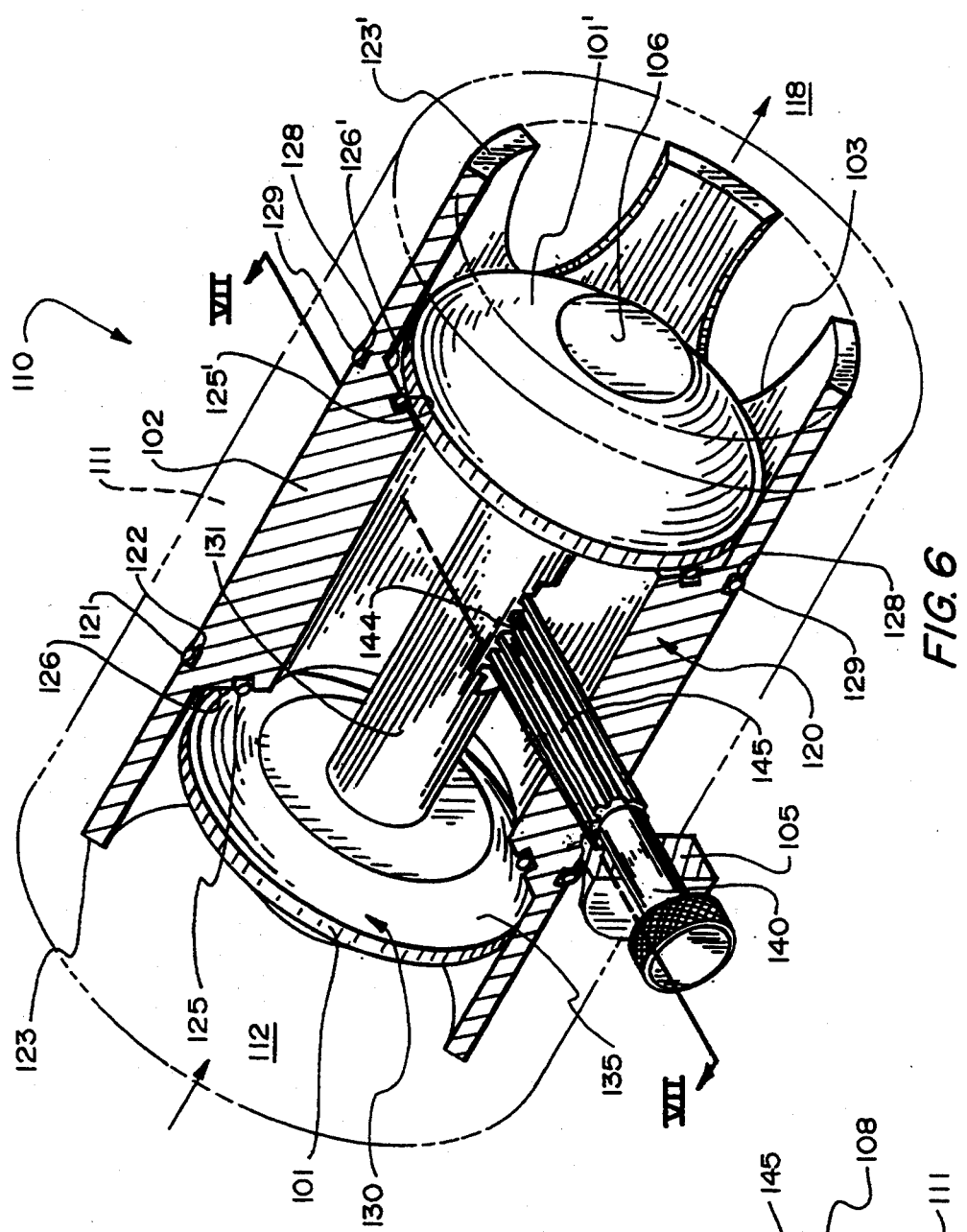
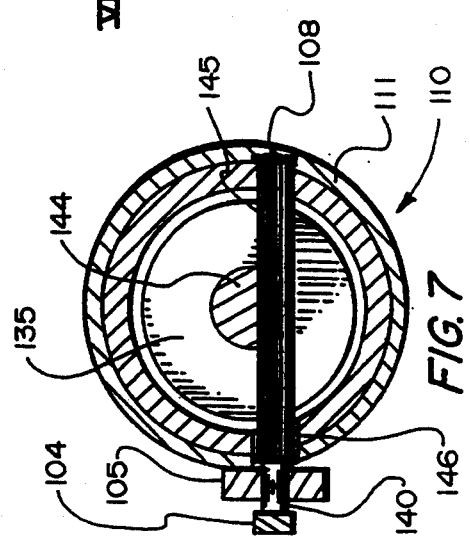

FLUID VALVE MECHANISM AND VALVING METHOD

This is a division of application Ser. No. 08/065,810, filed 21 May 1993, now U.S. Pat. No. 5,309,934.

TECHNICAL FIELD

This invention relates to fluid valving and relates especially to means and methods for balancing actuation and adjustment thereof.

BACKGROUND OF THE INVENTION

Fluid valves, whether for liquids or gases, necessarily have components exposed to fluid being restrained from flowing as would have occurred in the absence of any valving. Increased pressure of fluid so restrained makes added demands upon valve structures, stressing not only connectors, housing, and seals, but also whatever part(s) may be designed to close, adjust, or open the valve to flow.

Conventional valves have been modified to cope with the forces to be overcome, as by shielding components with sliding or rotary sleeves, building leverage into an individual valve, or cascading valves to enable a small valve to control a larger one. Proponents have characterized some of those configurations as balanced, such as in U.S. Pat. No. 3,425,448 to Peterson, for Fluid Pressure Balanced Valve, U.S. Pat. No. 3,658,450 to Woodling, for Balanced Fluid Pressure Valve Means, U.S. Pat. No. 4,190,231 to Vimercati, for Bilaterally Balanced Fluid Control Valve. Numerous valve-adjustment mechanisms are known, including cams, pivoted arms, and even rack-and-pinion devices, some of which are shown in U.S. Pat. No. 829,120 to Mumford, U.S. Pat. No. 2,074,701 to Lohmolder, and U.S. Pat. No. 4,260,128 to Tito. Electromechanical actuators are known and are often employed for their capability of applying considerable force and, in servo form, for their ability to hold any selected position, such as fully closed, any given intermediate setting, or fully open.

Notwithstanding the existing variety of fluid valves, there is a pressing need to render valve structure and adjustment simpler and more nearly independent of applied fluid pressure, rather than going on and on to greater complexity and sophistication in order to cope with requirements for increasing reliability, safety, and utility. This present invention of mine meets that need in a fundamental way.

SUMMARY OF THE INVENTION

A primary object of the present invention is to balance out the fluid pressure applied to upstream surfaces of a fluid valve.

Another object of this invention is to simplify valve adjustment, at and between fully closed position and open positions.

A further object of the invention is to provide coaxial valve mechanisms adapted to accomplish the foregoing objects.

From a generalized method point of view, the objects of this invention are accomplished by laterally confining fluid flow to an open-ended substantially cylindrical passageway having a linear axis extending between an inlet opening thereinto (upstream) and an outlet opening therefrom (downstream) through which fluid is enabled to flow in open valving positions but not to flow in closed valving position, and interposing flow barriers dividing the passageway cross-section into a flow-obtruding axial or central core portion and a complementary flow-obtruding peripheral or annular portion. Those respective barriers are adapted in open valving position, when in non-juxtaposed mutually unseated locations lengthwise of the passageway, to extend across and to obtrude only individually respective parts of the passageway cross-sectional extent (rather than its entire extent), and in closed valving position, when juxtaposed into mutually seated locations lengthwise of the passageway, together to extend across and obtrude essentially the entire cross-sectional extent of the passageway and thereby to preclude flow therethrough.

More particularly, the method of this invention includes the steps of forming the passageway as a bore with a cylindrical wall in a valve housing, providing the annular barrier as a first piston-like member fitting slidably against the cylindrical wall and hollowed internally, providing the core barrier as a second piston-like member fitting slidably within the hollowed interior of the first piston-like member and about the axis, and providing circumferential seats on the respective piston-like members adapted to be juxtaposed into mutual seating (i.e., sealing) contact in the closed position, and preferably including adjustability to move the piston-like members apart and also to move them together.

In general apparatus terms, the objects of the present invention are attained in fluid valve mechanism having a housing with a fluid inlet and a fluid outlet interconnected by an axial bore containing piston-like coaxial valve members movable therealong between limited upstream and downstream locations (including closed and open valve positions), being adapted to be mutually seated in the closed position and so obtruding the entire cross-sectional extent of the bore and precluding flow therethrough, and adapted to be mutually unseated in open position(s), and so obtruding only part of the bore cross-sectional extent, allowing flow through the unobtruded extent.

In a preferred embodiment, the valve mechanism includes a pair of coaxial piston-like valve members: an annular outer member fitting in coaxial orientation within the housing bore and slidably movable therealong between upstream and downstream location limits, itself being adapted to obtrude a peripheral extent of the bore cross-section but not a complementary inner or core extent of the bore cross-section; and a coaxial piston-like inner or core valve member fitting slidably within the outer valve member and itself adapted to obtrude only a complementary core cross-sectional extent of the bore, both piston-like members together being adapted when juxtaposed into mutually seated engagement (closed position) to obtrude essentially all of the housing bore cross-sectional extent.

The invention also preferably includes adjusting means adapted to move the outer and inner valve members axially along the bore in opposite directions between upstream and downstream locations, to and from a mutually seated closed position and a mutually unseated open position. The adjusting means preferably is adapted to pivot in one direction to move the piston-like members apart, and in the opposite direction to move them together, as by gear action or its equivalent.

Other objects of the present invention, together with means and methods for attaining the various objects, will become apparent from the following description and the accompanying diagrams of preferred embodiments presented here by way of example rather than limitation.

SUMMARY OF THE DRAWINGS

FIG. 6 is a perspective view, partly in phantom and partly cut away, of a second embodiment;

FIG. 7 is a medial transverse sectional elevation of the embodiment of FIG. 6;

DESCRIPTION OF THE INVENTION

Figure 1:
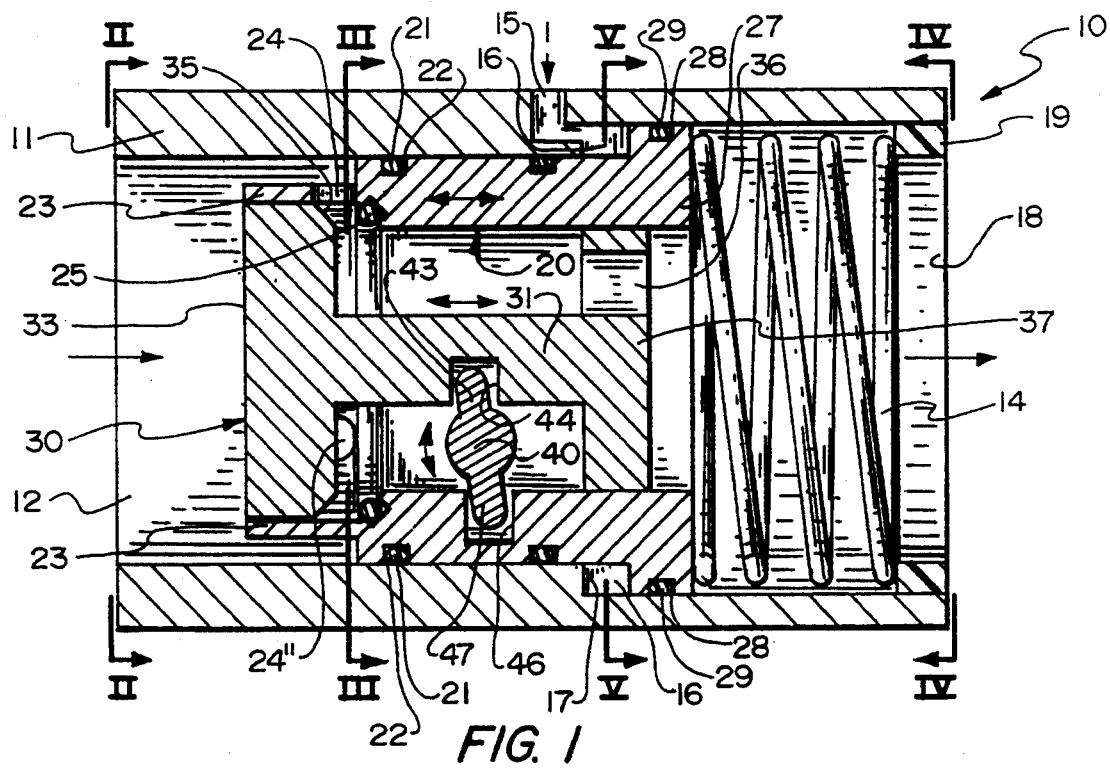
FIG. 1 is a side sectional elevation of a first embodiment.

FIG. 1 shows, in lengthwise (axial) side sectional elevation, valve embodiment 10, in open position, featuring cylindrical open-ended housing 11 having a cylindrical bore between inlet opening 12 at the left (arrow in) and outlet opening 18 at the right (arrow out) and step 17 from larger right, to smaller left, coaxial diameters of the housing bore. At top center the housing has small transverse pilot bore 15 extending first radially from the outside then doglegging to the right to erupt from the end of housing step 17 into annular pilot chamber 16 formed between adjacent ends of the respective valve members whenever spaced apart (as they are here).

Inside housing 11 are two coaxial piston-like valve members, each of which constitutes something of a barrier to flow of fluid. Annular outer member 20, stepped outward (lazy L-like in section) at its right end 27 to complement step 17 of the housing wall, fits slidably against and along the wall. Its hollow interior enables the annular outer valve member to surround piston-like core inner valve member 30 circumferentially. The latter surrounded valve member is H-like in axial section, having upstream (left) end portion 33, downstream (right) end portion 37, and intervening stem 31, and fits slidably over a limited axial distance within the outer member.

FIG. 1 also shows retaining ring 19 inside the open right end of the housing bore. This retaining bears against and retains in place the right end of helical spring 14, whose left end bears against right end 27 of annular outer piston-like member 20, biasing it against step 17 of the bore wall-to the closed valve position.

Circumferential grooves 22, 22' in left and intermediate portions of member 20 hold O-rings 21, 21' in sealing contact with the unstepped (smaller diameter) major portion of the housing bore wall, and similar groove 28 in right end portion of member 20 holds O-ring 29 in like sealing contact against the outwardly stepped (larger diameter) part of the housing bore wall. Extreme left end part 23 of annular piston-like member 20 is thinned radially from both of its cylindrical surfaces, relieving (spacing) it both (i) from the surrounding housing bore wall and accommodating flow to its hollow interior via small radially oriented bores 24, 24' (hidden here), and 24"; and (ii) from its otherwise uniform inner diameter to a larger diameter, thus accommodating the peripheral surface of the core piston-like member therewithin. Right end portion 37 of inner member 30 has axially parallel outlet bore 36 (and spaced companion bores 36', 36"-hidden here) from the hollow between the outer and inner piston-like members into open outlet end 18 of the housing. The left inner rim of the non-relieved part of the outer piston-like member is chamfered into an oblique valve seat 25 (preferably with groove and O-ring) adapted to be juxtaposed, in the closed valve position, against parallel seat 35 of inner member 30. In seated position the left end of the inner member also slides across and closes off the radial bores of the outer member.

FIG. 1 also shows means for adjustment of the piston-like valve members between closed and open valve positions. The midpart of the inner (upper) wall of the outer piston-like member has slot 46 therein accommodating lower lobe 47 of adjusting shaft 40, and the underside of stem-like part 31 of the inner piston-like member has slot 44 in it accommodating upper lobe 43 of the adjusting shaft. The shaft may be located inside the valve housing and be equipped conventionally for electromagnetic actuation, or may extend (sealed) outside through the housing wall to be worked manually or otherwise. Resulting limited translatory movement of the piston-like members slides them oppositely axially to and fro in cylindrical housing 11. It will be understood that respective seats 25 and 35 are juxtaposed into mutual seating (and sealing) engagement at the clockwise limit of shaft rotation, and are unseated by counterclockwise rotation.

FIGS. 2 to 5 augment FIG. 1 with left and right end views, and transverse sectional views, of the same structural embodiment, as indicated by corresponding Roman-numbered view lines on FIG. 1. The reference numerals are unchanged (but not all seen in every view).

Figure 2:
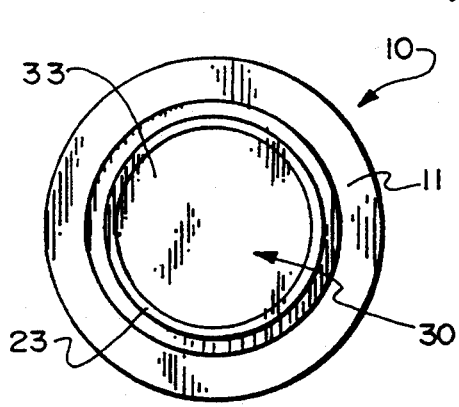
FIG. 2 is a left end elevation as indicated at II—II on FIG. 1.

FIG. 2 shows embodiment 10 of FIG. 1 viewed in end elevation from the left (at II—II on FIG. 1) showing inlet end 12 of housing 11 occupied mainly by circular end portion 33 of inner or core valve member 30, surrounded by thinned end portion 23 of outer annular valve member 20, spaced from the inside surface of the housing sidewall by a distance about equal to its reduced end thickness.

Figure 3:
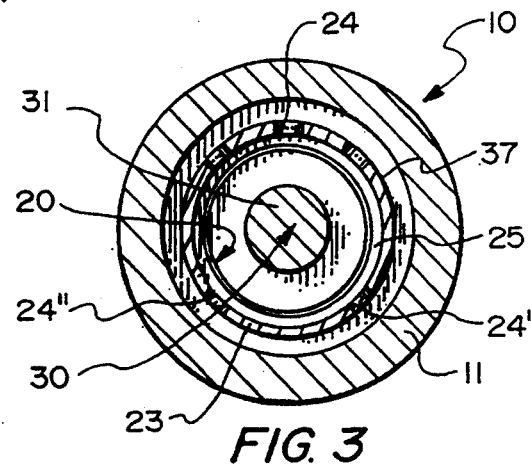
FIG. 3 is a transverse sectional view along III—III on FIG. 1.

FIG. 3 shows same embodiment 10 in transverse section (along III—III on FIG. 1) through spaced radial bores 24, 24', and 24" in thinned end portion 23 of the outer member spaced from the housing wall. The next inner ring is chamfered edge 25 (O-ring not distinct) against which chamfered edge 35 (not seen here) of inner valve member 30 is adapted to seat. At the core is stem 31 of inner member 30 surrounded by the hollow between it and outer valve member 20.

Figure 4:
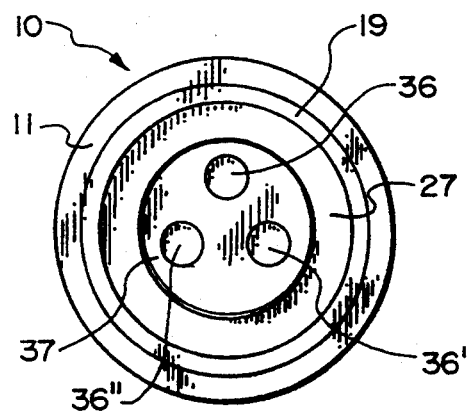
FIG. 4 is a right end elevation as shown at IV—IV on FIG. 1.

FIG. 4 shows same embodiment 10 viewed in end elevation from the right (at IV—IV on FIG. 1) which shows smaller end portion 37 of inner valve member 30 with spaced axial parallel bores 36, 36', 36" and closely surrounded by thick end portion 27 of outer valve member 20. Just inside the outlet end of the housing bore is ring 19.

Figure 5:
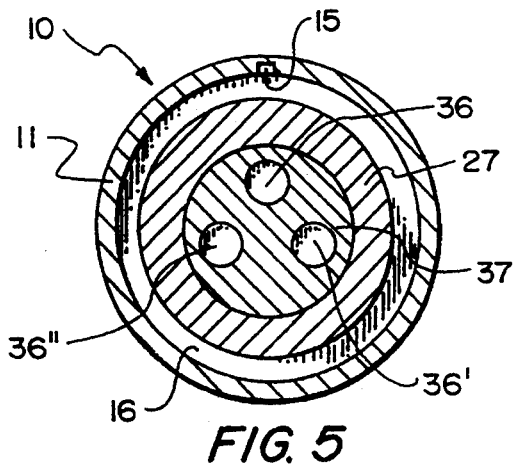
FIG. 5 is a transverse sectional elevation at V—V on FIG. 1.

FIG. 5 also shows this embodiment sectioned through housing 11 (at V—V on FIG. 1) and adjacent annular space 16 (adjacent the pilot bore, not shown here) created between the stepped outer wall and the body of outer member 20 adjacent the L-end thereof—when the valve is opened. Visible just inside the outer member is circumferential end portion 37 of inner core member 20 with spaced axially parallel bores 36, 36', 36" therethrough.

As shown in FIGS. 1 through 5, and as principally described, the first valve embodiment is considered to be at least partly open. Its closed position can be visualized from FIG. 1 by mentally expanding the biasing spring to the left until the L-base outward offset of the annular piston-like valve member abuts the step of the inside wall of the housing bore, whereupon the valve seats on respective annular and core piston-like members are mutually juxtaposed, and the left end part of the former closes off the radial bores in the latter, precluding flow through the valve mechanism. The overall operation of this embodiment is readily understood from the previous structural description and accompanying illustrations, as follows.

Movement to the closed position entails clockwise turning of the keylike adjusting shaft, moving the annular outer member leftward and the core inner member rightward, juxtaposing the seat on the left inner rim of the outer member and the seat on the right outer rim of the inner member. If the valve is to be opened, the shaft is turned counter-clockwise, moving the outer piston-like member to the right, and the inner piston-like member to the left, compressing the spring and opening communication between the exterior and the pilot chamber via the pilot opening. Instead of and/or in addition to turning the adjusting shaft, fluid may be forced into the pilot bore and chamber under sufficient pressure to open the valve or to aid in doing so. The valve can be readily closed subsequently by doing the opposite of the steps involved in opening it.

In subsequent embodiments, analogous parts are identified by the same two digits as in the first embodiment-but are prefixed by a third digit, different for each added embodiment. In the following embodiments, the prefixed third digits are 1 and 2, respectively.

Figure 8:
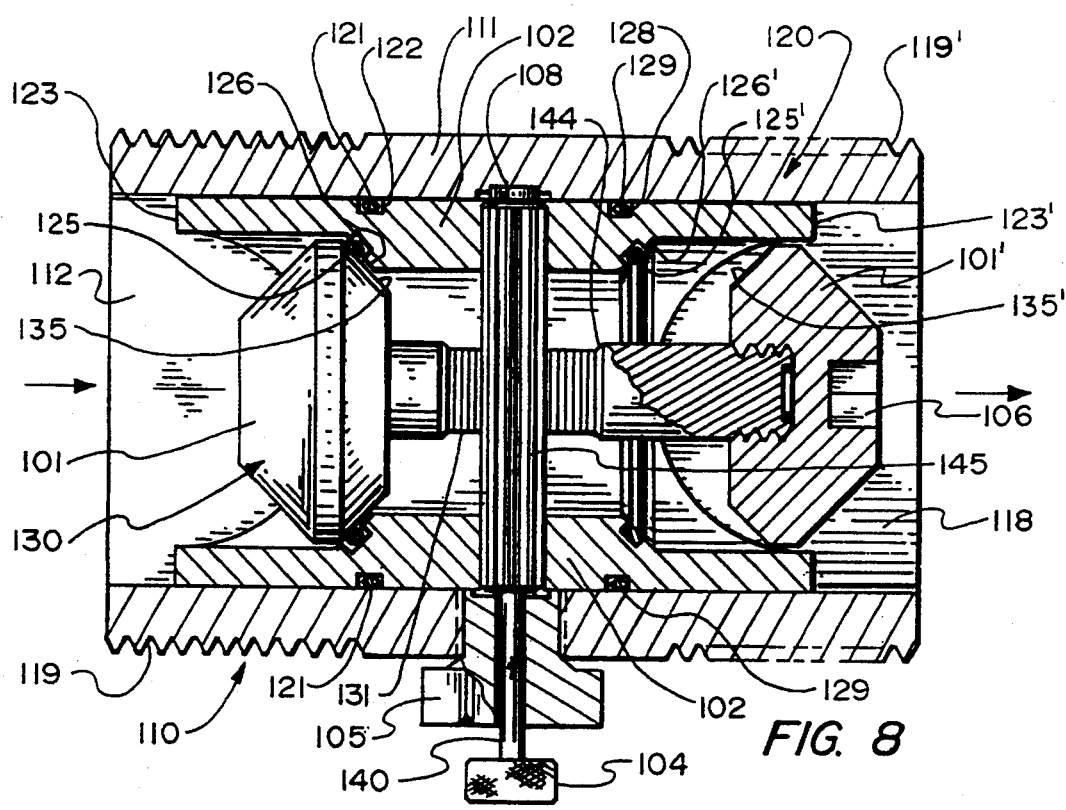
FIG. 8 is a bottom sectional plan of the second embodiment.

FIGS. 6, 7, and 8 show diverse views of valve embodiment 110: FIG. 6 in perspective, partly in phantom and partly sectioned away; FIG. 7, medial transverse section; FIG. 8, sectional bottom plan. This embodiment features housing 111 having an open-ended straight-through bore construction, from inlet opening 112 at the left to outlet opening 118 at the right. Housing ends 119, 119' are shown threaded outside in FIG. 8 for conventional screw-in attachment.

Annular outer piston-like valve member 120 of this embodiment has a cylindrical sleeve-like configuration, relatively thick in its midportion 102, and thinner at its opposite ends 123, 123'. This outer member fits slidably against the inside surface of the housing sidewall, has circumferential groove 122 near its upstream end accommodating O-ring 121 as sealing means, and has like groove 128 near its downstream end accommodating O-ring 129 for the same purpose. This cylindrical valve member has a plurality of curved indentations 103 in its opposite ends so as to enable fluid to flow from the inlet to the outlet past components of the inner or core coaxial piston-like valve member when the valve is open, that is whenever the respective valve members are not juxtaposed into mutual seating (and sealing) engagement as they are in the closed valve position.

Inner piston-like valve member 130 has a double-ended dumbbell configuration, with upstream bell 101 and downstream bell 101', both threaded onto interconnecting axial bar 131, as by use of a wrench in axial hex indentations 106 in their outer ends. The outer rims of the dumbbell pair fit slidably against-and are centered by contact with the inside surface of thinner wall portions 123, 123' of the annular valve member, which has its inner upstream rim 126 and downstream rim 126' chamfered parallel to the adjacent sloping dumbbell surfaces 135 and 135' and containing O-rings 125, 125' so as to seat therewith when they are juxtaposed to one another.

Both piston-like valve members are limited in their equal but opposite lengthwise movement by rack indentations 144 and 146 on the respective inner and outer piston-like valve members, as engaged by pinion gear 145 occupying most of the length of shaft 140 of the adjusting means, the smooth near end of which extends through a transverse bore in the near edge part of housing 111 and a slot in outer member 120—both ahead of the plane of this view and thus not shown. The far end of shaft 140 is journaled in recess 108 (FIG. 8) in the housing. Shaft 140 has knurled adjusting knob 104 on its near end and is held rotatably within hex nut 105 snugly fitted into the surrounding housing bore (unseen here). No attempt is made to show the sealing of the adjusting shaft, because such sealing is not a novel part of this invention and may be entirely conventional.

At either extreme of shaft rotation the valve is closed, as one of the oblique dumbbell surfaces is juxtaposed to the chamfered rim of the adjacent outer member and becomes sufficiently seated to it. At intermediate settings neither end is seated so the valve is open.

Figure 9:
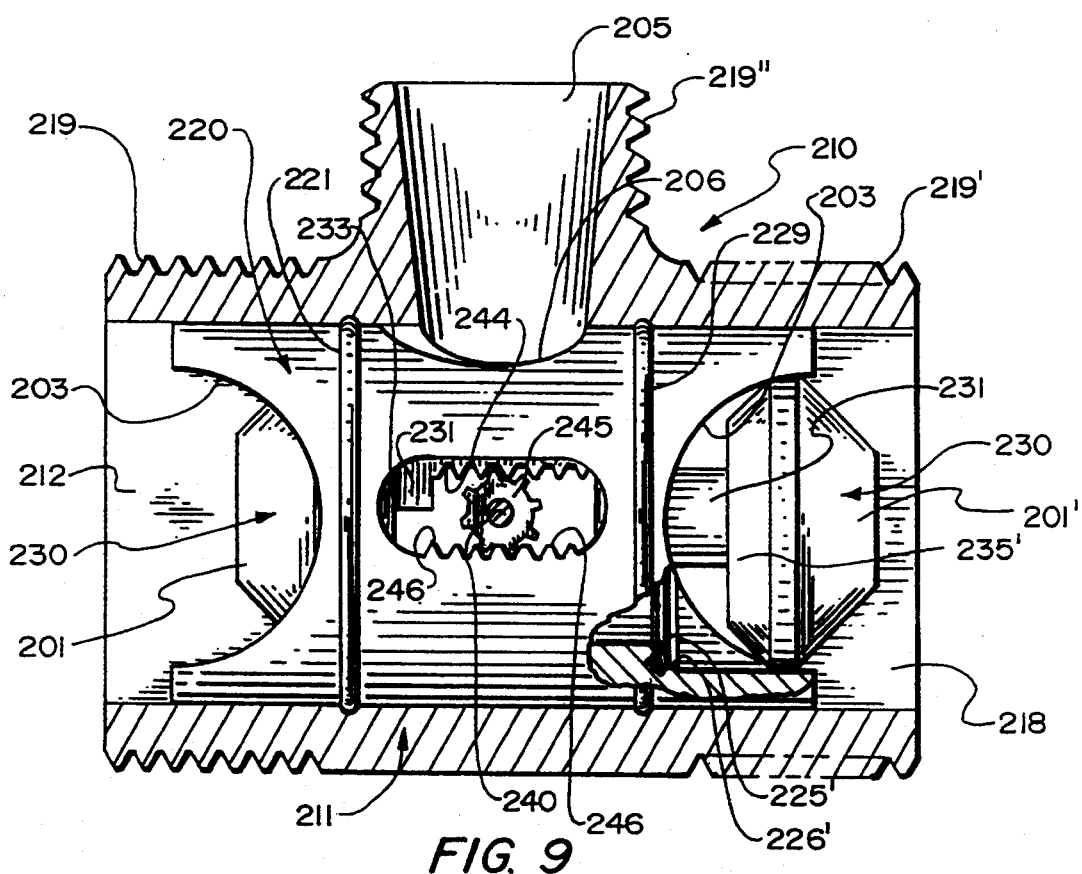
FIG. 9 is a side sectional elevation of a third embodiment much like the second embodiment but with an inverted-T three-way bore.

FIG. 9 shows third embodiment 210 in side elevation, partly sectioned away to show an interior substantially as in the FIGS. 6, 7, and 8 embodiment although this embodiment differs in having an inverted-T three-way configuration of housing bores. The external bore-defining T-ends of housing 211 are threaded externally, namely, horizontal ends 219, 219' and vertical end 219". The housing has a straight-through horizontal bore (between end openings 212 and 218) plus an intersecting vertical bore 205 communicating with the interior via opening 206 in the top of annular outer piston-like valve member 220. The cylindrical body of that outer valve member has circumferential O-rings 221, 229 in grooves flanking the added top opening, and its right and left ends have multiple curved indentations 203 therein. Those end indentations reveal part of left and right bells 201, 201' of dumbbell-shaped inner piston-like valve member 230 joined by bar 231, partly visible through slot 233 in the center of the view. Also visible through the slot are parts of rack portion 244 of bar 231 and rack portion 246 of the outer member. The bells have sloping faces 235, 235' adapted to seat against O-rings 225, 225' when juxtaposed to respective chamfered inner rims 226, 226' of the outer member at either extreme of adjustment—both being closed valve positions. Full clockwise rotation of pinion 245 by adjusting shaft 240 results in closure at the left, as here. Intermediate positions (readily visualized) open the valve at both horizontal ends—equally if centered, otherwise greater and lesser.

Thus, if bore 205 is connected to an upstream source of fluid under pressure, the outflow divides equally among end openings 212, 218 of the straight-through bore when centered in dual-open position—and unequally in all other open positions. With shaft 240 turned fully clockwise (as here) outflow will leave via right end opening 218 only, whereas at full counterclockwise rotation of the shaft all outflow will leave via left end opening 212, as the bells of the inner member reverse their seated and unseated positions.

Either the 2-way embodiment of FIGS. 6, 7, and 8 or the 3-way embodiment of FIG. 9 can be interconnected in cascade with one another or with conventional valves to accommodate more complex flow circuits, such as for amplification or feedback, as well as for redirection or splitting of fluid streams.

The fluid valves of this invention do not require any special materials of construction but can be constructed of metal, plastic, glass, or other conventional material, depending upon the fluids and the fluid pressures, temperatures, and other conditions to which the valves are to be subjected. They can be threaded to existing piping or be secured adhesively where screw connection is not desirable.

The seals in the valves of this invention also can be made of conventional materials, such as those commonly employed for meeting similar gasketing requirements, and may be in the form of O-rings (as illustrated) or alternatively U-cups, diaphragms, etc. These valves are readily disassembled (and reassembled) as for cleaning, for replacement of seals or other parts, or for other maintenance.

The fluid-force balancing of valves of this invention provides system designers with the opportunity to meet diverse demands of the fluid system without necessary redesign of valve characteristics. Matching, or intentional mismatching, of whatever cross-sectional areas are presented to the fluid by the complementary piston-like valve members provides versatile valving able to cooperate with the applied fluid forces as desired, rather than fighting against them.

Various advantages of the application and use of this invention have been mentioned, and other beneficial features may well become apparent to persons who undertake to learn about or to practice it.

Preferred embodiments of this invention and variants of it have been described and illustrated. Other modifications may be made, as by adding, combining, deleting, or subdividing compositions, parts, or steps, while retaining some of the advantages and benefits of the present invention—which itself is defined in the following claims.

I claim:

1. In a fluid housing having at least one fluid inlet and at least one fluid outlet and having a bore defining a generally cylindrical passageway for fluid between an inlet and an outlet, the improvement comprising
    a core valve member, movable along the passageway, and having a pair of circumferential valve seats spaced apart a given distance;
    an annular valve member laterally surrounding the core valve member, and also movable along the passageway, and having a pair of circumferential valve seats spaced apart a different distance;
    positioning adjustment means adapted to move at least one of the valve member along the passageway and oppositely to the other valve member, to and from one seated position per direction of movement, whereat flow through the passageway is precluded;
    a seat on the core valve member being adapted to be juxtaposed to a seat on the annular valve member in seated position, the juxtaposed seats together being effective to preclude flow through the passageway, whereas flow through the passageway is enabled whenever the valve members are unseated in non-juxtaposed position.

2. Fluid valve improvement according to claim 1, wherein the valve members present equal barriers to flow along the passageway.

3. Fluid valve improvement according to claim 1, wherein the positioning means is connected to at least one of the valve members to move it relative to the other valve member and along the passageway to and from the pair of seated positions spaced therealong.

4. Fluid valve improvement according to claim 3, wherein the positioning means is connected to both valve members to move them oppositely therealong to and from both spaced seated positions.

5. In fluid valve mechanism, wherein fluid flows from an inlet opening downstream to and out from at least one outlet opening of a valve housing, the improvement comprising
    a plurality of circumferentially contiguous piston-like valve members in a generally cylindrical bore of the valve-housing, including
    an annular outer sleevelike valve member, and a coaxial core inner valve member radially surrounded by the outer sleevelike valve member,
    both of said valve members being movable to and fro in opposite directions along the bore axis, and adapted to seat against one another in a no-flow closed valve position and to unseat from one another, thereby establishing a flow passageway therethrough, in open flow positions, and wherein said movement of said outer sleevelike valve member and said inner valve member is due to actuation by an actuating means acting upon at least one of said piston-like valve members,
    the annular outer valve member and the coaxial core inner valve member being adapted when mutually seated to obtrude together the entire cross-section of the bore including the passageway, thereby controlling fluid flow, and adapted when mutually unseated to enable fluid flow through said bore including said passageway.

6. Fluid valve mechanism improvement according to claim 1, wherein the annular outer valve member and the coaxial core inner valve member are dimensioned to obtrude substantially equal cross-sectional extents of the bore, and thereby balanced relative to upstream-to-downstream fluid force applied to them.

7. Fluid valve mechanism improvement according to claim 1, wherein the outer sleevelike member is outwardly cylindrical and is contiguous with the cylindrical bore and slidable therealong, and is inwardly substantially cylindrically hollow, and has between and adjoining its opposite end portions a thicker intervening portion adapted when juxtaposed thereto to seat with the coaxial inner core member where it adjoins one of the end portions thereof.

8. Fluid valve mechanism improvement according to claim 3, including circumferential valve seats along the junctions of the thicker intervening portion with each of the adjoining end portions of the sleevelike member.

9. Fluid valve mechanism improvement according to claim 3, wherein the coaxial inner valve member is dumbbell-shaped, having a pair of bells spaced apart on axial interconnecting means by more than the length of the intervening portion of the sleevelike member.

10. Fluid valve mechanism improvement according to claim 5, wherein the bore has two opposite ends, with an inlet opening at one of its ends, and an outlet opening at the other of its ends.

11. Fluid valve mechanism improvement according to claim 5, wherein the bore has two opposite ends, with an outlet opening at each of its ends, and an inlet opening between its ends.

12. Fluid valve mechanism, comprising a housing defining
a cylindrical first bore with opposite open ends, and a second bore connecting the first bore between the opposite open ends, the housing also containing
a sleevelike valve member outwardly cylindrical and contiguous with the cylindrical bore, slidable therealong to intermediate positions between given limits, opening flow communication between the first bore and the second bore at such intermediate positions, said sleevelike member being inwardly cylindrically hollow, having between and adjoining its opposite end portions a thicker intervening portion comprising a spaced pair of circumferential valve seats where it adjoins the thinner end portions;
a coaxial inner valve member in the shape of a dumbbell with a pair of bells surrounded circumferentially by the sleevelike valve member and spaced axially apart on interconnecting axial means a distance exceeding the spacing of said circumferential outer valve seats and the corresponding length of the thickened intervening outer valve member portion, the bells each having a circumferential surface adapted to seat selectively against one of the valve seats on the outer valve member when juxtaposed thereto;
the respective valve members being movable together oppositely to and fro along the bore axis by adjusting means operably engaged therewith, and being adapted to seat selectively against one of said valve seats in either of two extreme positions, wherein one of the open ends of the first bore is closed off together with said flow communication, and also adapted to unseat selectively from each of the valve seats in said intermediate positions wherein both ends of the first bore are open to said flow communication through the second bore.

13. Fluid valve mechanism according to claim 8, wherein the respective ends of the outer sleevelike member are scalloped so as to facilitate axial flow past their adjacent bell when unseated.

14. Fluid valve mechanism according to claim 8, including adjusting means adapted to move the outer and inner valve members axially along the bore in opposite directions to and from either of the mutually seated closed positions and unseated open positions.

15. Fluid valve mechanism according to claim 10, wherein the adjusting means includes a rack on the outer valve member, a rack on the inner valve member, and a pinion interconnecting the two racks and adapted to be turned from outside the valve housing and thereby position the valve members axially relative to one another.

16. Fluid valving method, comprising the steps of
providing an inverted-T three-way configuration of housing bores, including a cylindrical T-bar bore and an intersecting T-base bore,
providing in the T-bar bore an outer piston-like valve member in sleevelike form fitting slidably in and along the cylindrical bore and hollowed inwardly about the axis, with circumferential seats spaced apart along the inner surface of the sleeve,
providing in the T-bar bore a coaxial inner piston-like valve member in the form of a dumbbell fitting slidably along within the hollowed interior of the outer piston-like valve member and about the axis, with seating surfaces on its respective balls spaced further apart than the spacing between the circumferential seats, and each bell defining with the circumferentially surrounding outer valve member an adjacent passageway between the T-bar bore and the T-base bore, and
providing position-adjustment means operatively engaged with said outer sleevelike valve member and said inner valve member so as to move the outer and inner valve members oppositely along the axis of the T-bar bore into mutual seated contact at either of two opposite extreme selective positions so as to preclude fluid flow through the adjacent passageway between the T-bar bore and the T-base bore and thereby selectively moving said inner valve member seating surfaces out of contact with their respective circumferential spaced apart seats of said outer sleevelike valve member so as to allow fluid flow thereby through a selected one of said adjacent passageways, said T-bar bore and said T-base bore.

17. Fluid valving method according to claim 12, including the steps of providing fluid to the T-base bore as an inlet, positioning the respective members so that neither bell is juxtaposed to a seat on the sleevelike member, whereby both ends of the T-bar bore are open, thereby splitting fluid inflow between the respective outlets.

18. Fluid valving method according to claim 12, including the step of providing fluid to the T-base bore as an inlet, juxtaposing a selected one of the respective bells to a seat on the sleevelike member, thereby precluding fluid flow through the adjacent end of the T-bar bore, and enabling all fluid inflow to flow though the opposite end of the T-bar bore as an outlet therefrom.

* * * * *